United States Patent
Nagahashi (10) Patent No.: US 9,496,071 B2
(45) Date of Patent: Nov. 15, 2016

(54) SHIELD WIRE

(71) Applicant: YAZAKI CORPORATION, Tokyo (JP)

(72) Inventor: Mitsuharu Nagahashi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/082,837

(22) Filed: Nov. 18, 2013

(65) Prior Publication Data

US 2014/0144696 A1   May 29, 2014

Related U.S. Application Data

(63) Continuation of application No. PCT/JP2012/062871, filed on May 18, 2012.

(30) Foreign Application Priority Data

May 19, 2011   (JP) ................. 2011-112145

(51) Int. Cl.
*H02G 3/00*  (2006.01)
*H01B 7/00*  (2006.01)
(Continued)

(52) U.S. Cl.
CPC ......... *H01B 7/0045* (2013.01); *B60R 16/0215* (2013.01); *H01B 7/00* (2013.01);
(Continued)

(58) Field of Classification Search
CPC .......... H01B 5/08; H01B 7/0045; H01B 7/08; H01B 7/0807; H01B 7/0823; H01B
(Continued)

(56) References Cited

U.S. PATENT DOCUMENTS 4,774,148 A  * 9/1988 Goto .................. B32B 15/04
                                              428/607
5,416,268 A    5/1995 Ellis
(Continued)

FOREIGN PATENT DOCUMENTS

EP      0634755 A2    1/1995
JP        567226 U    1/1981
(Continued)

OTHER PUBLICATIONS

Written Opinion dated Jun. 12, 2012 from the International Searching Authority in counterpart application No. PCT/JP2012/062871 [PCT/ISA/237].
(Continued)

*Primary Examiner* — Timothy Thompson
*Assistant Examiner* — Guillermo Egoavil
(74) *Attorney, Agent, or Firm* — Sughrue Mion, PLLC (57) ABSTRACT

In a shield wire, a sheet shaped metal foil shield member is provided so as to envelop an inner wire part having a plurality of conductors and insulators. In the shield wire, the inner wire part is enveloped by the metal foil shield member so that the inner wire part is held and an end part of the metal foil shield member is avoided from collapsing or the end is avoided from bounding.

18 Claims, 10 Drawing Sheets

(51) Int. Cl.
*B60R 16/02* (2006.01)
*H01R 13/6592* (2011.01)
*H01R 4/20* (2006.01)
*H01R 9/03* (2006.01)

(52) U.S. Cl.
CPC .............. *H01R 4/203* (2013.01); *H01R 9/034* (2013.01); *H01R 13/6592* (2013.01); *H01R 2201/26* (2013.01)

(58) Field of Classification Search
CPC .............. 7/0838;H01B 7/0861; H01B 7/0869; H01B 7/2825; H01B 7/25; H01B 7/17; H01B 9/021; H01B 9/028; H01B 11/1025; H01B 11/1008; H01B 11/1091; H01B 13/012; H01B 13/262; H01B 17/60; H01B 17/66; H01B 7/2824; B29C 44/5627; B29C 59/022; B29C 7/00; B29C 7/0007; B60R 16/0215; B60R 16/02; B60R 16/207; B60R 16/0222; B61L 15/0036; B61L 15/0081; B61G 5/10; B65D 63/10; C09J 7/02; C09J 7/0275; C09J 7/0289; C09J 2203/302; C09J 2423/00; H01F 27/323; H01R 4/203; H01R 9/034; H01R 9/032; H01R 13/6463; H01R 13/6599; H01R 43/0207; H01R 2201/26; H02G 1/06; H02G 3/04; H02G 11/00; F16B 2/08; F16F 15/02; Y10S 174/26; Y10S 174/25; Y10T 428/2936
USPC ........ 174/105 R, 251, 261, 359, 74 R, 70 R, 174/36, 108, 68.3, 386, 394, 72 A, DIG. 25, 174/DIG. 26, 120 R, 350; 29/857 R, 828; 439/607.41, 607.5, 607.55; 156/56; 280/422; 336/206; 428/377
See application file for complete search history.

(56) References Cited

U.S. PATENT DOCUMENTS

| | | | |
|---|---|---|---|
| 6,225,556 B1 | 5/2001 | Saito | |
| 6,686,537 B1 | 2/2004 | Gareis et al. | |
| 6,863,753 B1 * | 3/2005 | Murooka | H01B 7/0838 156/351 |
| 2002/0170729 A1 * | 11/2002 | Murakami et al. | 174/35 R |
| 2003/0150633 A1 | 8/2003 | Hirakawa et al. | |
| 2004/0026101 A1 | 2/2004 | Ochi | |
| 2004/0082222 A1 * | 4/2004 | Okamura | H01R 13/5205 439/607.58 |
| 2005/0215122 A1 * | 9/2005 | Nishida | 439/610 |
| 2007/0270024 A1 * | 11/2007 | Matsuoka | H01R 4/183 439/465 |
| 2011/0127084 A1 | 6/2011 | Ichikawa et al. | |
| 2011/0248473 A1 * | 10/2011 | Emoto | B61G 5/10 280/422 |
| 2012/0103648 A1 | 5/2012 | Ogura et al. | |
| 2012/0190238 A1 * | 7/2012 | Omae | H01R 13/6592 439/620.01 |
| 2012/0312597 A1 * | 12/2012 | Toyama | H01R 4/182 174/84 C |

FOREIGN PATENT DOCUMENTS

| | | | | |
|---|---|---|---|---|
| JP | 57-183618 A | 5/1981 | | |
| JP | 63207004 A | 8/1988 | | |
| JP | 757563 A | 3/1995 | | |
| JP | 10-93284 A | 4/1998 | | |
| JP | 2002289047 A | 10/2002 | | |
| JP | 2002304917 A | 10/2002 | | |
| JP | 2003-505839 A | 2/2003 | | |
| JP | 2003234025 A | 8/2003 | | |
| JP | 2004-253766 A | 9/2004 | | |
| JP | 2006-286480 A | 10/2006 | | |
| JP | 201047033 A | 3/2010 | | |
| JP | WO 2010079618 A1 * | 7/2010 | | B61G 5/10 |
| JP | 201114391 A | 1/2011 | | |
| WO | WO 2010038132 A2 * | 4/2010 | | B60K 7/00 |

OTHER PUBLICATIONS

Search Report dated Oct. 6, 2014, issued by the European Patent Office in counterpart European Application No. 12785197.0.
Office Action dated Dec. 12, 2014 issued by Korean Intellectual Property Office in counterpart Korean Patent Application No. 10-2013-7030661.
International Preliminary Report on Patentability dated Jun. 12, 2012 from the International Searching Authority in counterpart Application No. PCT/JP2012/062871.
Office Action dated Jul. 24, 2015, issued by the Korean Intellectual Property Office in counterpart Korean Application No. 10-2013-7030661.
Communication issued on Apr. 3, 2015 The State Intellectual Property Office of PR China in related Application No. 201280024328.6.
International Search Report dated Jun. 12, 2012 from the International Searching Authority in counterpart application No. PCT/JP2012/062871.
Written Opinion dated Jun. 12, 2012 from the International Searching Authority in counterpart application No. PCT/JP2012/062871.
Decision of Refusal issued on Oct. 20, 2015 by the Japanese Patent Office in related Application No. 2011-112145.
Office Action issued on Dec. 7, 2015 by the State Intellectual Property Office of P.R. China in counterpart Chinese Application No. 201280024328.6.
Communication issued Oct. 6, issued by the Korean Intellectual Property Office in counterpart Korean Patent Application No. 10-2013-7030661.
Communication issued Aug. 18, 2015, issued by the Japanese Patent Office in counterpart Japanese Patent Application No. 2011-112145.
Communication dated May 18, 2016 issued by The State Intellectual Property Office of P.R. China in counterpart Chinese Patent Application No. 201280024328.6.

* cited by examiner

SHIELD WIRE

CROSS REFERENCE TO RELATED APPLICATIONS

This application is a continuation of PCT application No. PCT/JP2012/062871, which was filed on May 18, 2012 based on Japanese Patent Application No. 2011-112145 filed on May 19, 2011, the contents of which are incorporated herein by reference. Also, all the references cited herein are incorporated as a whole.

BACKGROUND OF THE INVENTION

1. Technical Field

The present invention relates to a shield wire having a shielding function.

2. Description of the Related Art

In recent years, a hybrid motor vehicle or an electric vehicle attracts an attention as an ecologically-friendly car. Further, a propagation rate of the hybrid motor vehicle or the electric vehicle is increased. On the hybrid motor vehicle or the electric vehicle, a motor is mounted as a power source. In order to drive the motor, a high tension battery needs to be electrically connected to an inverter and the inverter needs to be electrically connected to the motor by a wire harness which can withstand a high tension. The wire harness which can withstand the high tension is formed so as to have a shielding function.

As for the shielding function, a shield member formed with a braided wire or a shield member formed with a metal foil and a drain line is ordinarily used (for instance, see below-described patent literatures JP-A-2002-304917 and JP-A-2002-289047).

In the above-described usual technique, when the shield member formed with the braided wire is used, a below-described problem arises. Namely, since the shield member uses the braided wire, when it is assumed that the braided wire is formed with, for instance, three hundred element wires, the shield member is relatively heavy. In recent years, for parts of the motor vehicles, since the parts are strictly requested to be lightened, the inventor of this application considers that the parts of the motor vehicle need to be lightened.

Further, in the above-described usual technique, when the shield member formed with the metal foil and the drain line is used, a below-described problem arises. Namely, since the shield member uses the metal foil and the drain line, a part is formed which cannot be covered with the metal foil in a terminal of the wire. Thus, the problem arises that a sufficient shield effect cannot be obtained.

In addition thereto, when the shield member formed with the metal foil and the drain line is used, a below-described problem also arises. Namely, in the shield member, when the drain line is arranged between electric wires, there is a fear that the drain line does not come into sufficient contact with the metal foil. Accordingly, a countermeasure may be considered that the drain line is arranged not between the electric wires, but outside the one electric wire. However, in this case, since the drain line has a thickness extremely larger than a thickness of the metal foil, the problem arises that a finished external form of a wire harness (or a cable) is the more deformed in the part of the drain line.

As for the metal foil, when an end part thereof collapses or bounds between the electric wires, a problem arises that the electric wire is unstably held, so that the shielding function cannot be sufficiently exhibited. Further, as for the metal foil and the drain line, a problem also arises that the drain line needs to be put in the metal foil, so that processes and a device are complicated.

SUMMARY OF THE INVENTION

The present invention is devised by considering the above-described circumstances and it is an object of the present invention to provide a shield wire which can be lightened and can sufficiently exhibit a shielding function, suppress a deformed external form and simplify processes or a device.

In order to solve the above mentioned problems, there is provided a shield wire including:
an inner wire part having a plurality of conductors and a plurality of insulators which cover the plurality of conductors and
a metal foil shield member having a metal foil and provided outside the inner wire part, wherein
the metal foil shield member is formed in the shape of a sheet and wound by one round or more on an outer periphery of the inner wire part so as to envelop the inner wire part therein, one end of the metal foil shield member in a direction of width of the sheet is arranged in a semicircular part as a part of an outer surface of the insulator which is not opposed to the other adjacent insulator and the other end of the metal foil shield member in the direction of width of the sheet is arranged in the semicircular part.

Both ends of the metal foil shield member in wire terminal sides may be set as ground connecting parts.

A high tension battery may be connected to an inverter or the inverter may be connected to a motor by the shield wire.

According to the present invention, since the shield member having the metal foil, that is, the metal foil shield member is used, the shield member can be effectively made to be exceptionally lighter than the shield member formed with the braided wire. Further, in the present invention, since the shield wire has a structure which includes the metal foil, however, does not use the drain line, the shield wire can be effectively lightened the more for the drain line or effectively suppress the deformed external form. Further, according to the present invention, since both the end parts of the metal foil shield member are arranged in the semicircular parts as one parts of outer surfaces of the insulators in section so as to suppress the collapse of the end parts or the bound of the end parts of the metal foil shield member, the inner wire part can be effectively held and stabilized and the shielding function can be sufficiently exhibited.

Further, according to the present invention, since the metal foil shield member has the ground connecting part, the inner wire part can be effectively covered with the metal foil shield member up to the terminal of the electric wire. Thus, a sufficient shield effect can be successfully obtained in the terminal of the electric wire.

Further, according to the present invention, the shield wire for a high tension which is preferably suitable for a hybrid motor vehicle or an electric vehicle can be effectively provided.

BRIEF DESCRIPTION OF THE DRAWINGS

FIG. 1A to FIG. 1D are diagrams relating to a shield wire of the present invention.

1C is a diagram showing one end and the other end positions of an inner wire part.

FIG. 2A and FIG. 2B are diagrams relating to a comparison of the shield wire.

FIG. 3A to FIG. 3C are views relating to a manufacturing method of the shield wire.

DETAILED DESCRIPTION OF THE EXEMPLARY EMBODIMENTS

A shield wire is provided with a sheet shaped metal foil shield member so as to envelop an inner wire part having a plurality of conductors and insulators. In the shield wire, the inner wire part is enveloped by the metal foil shield member so as to hold the inner wire part so that an end part of the metal foil shield member is avoided from collapsing or bounding.

Exemplary Embodiment

Figure 1A:
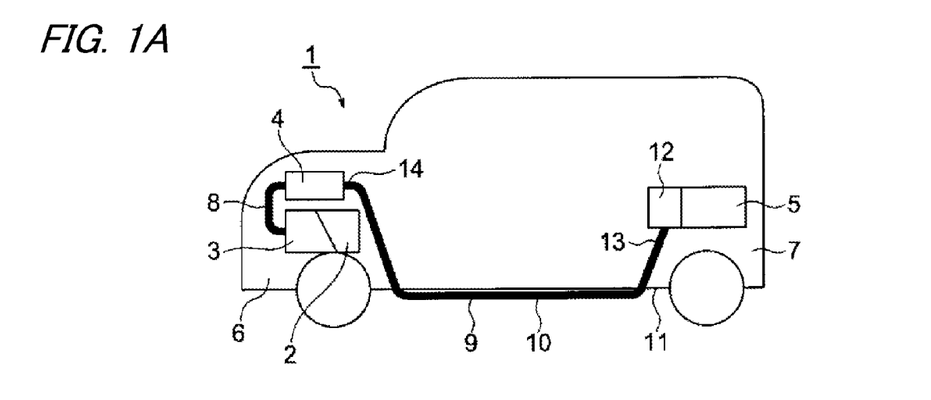
FIG. 1A is a schematic view of a vehicle.
Figure 1B:
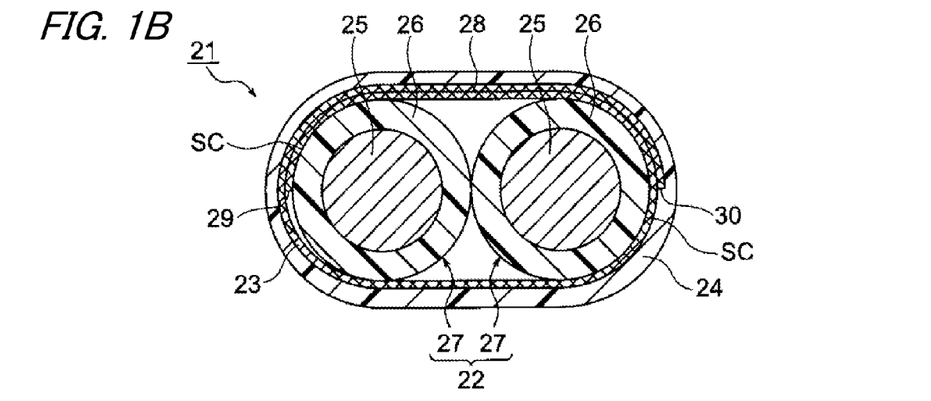
FIG. 1B is a sectional view of the shield wire. FIG.
Figure 1C:
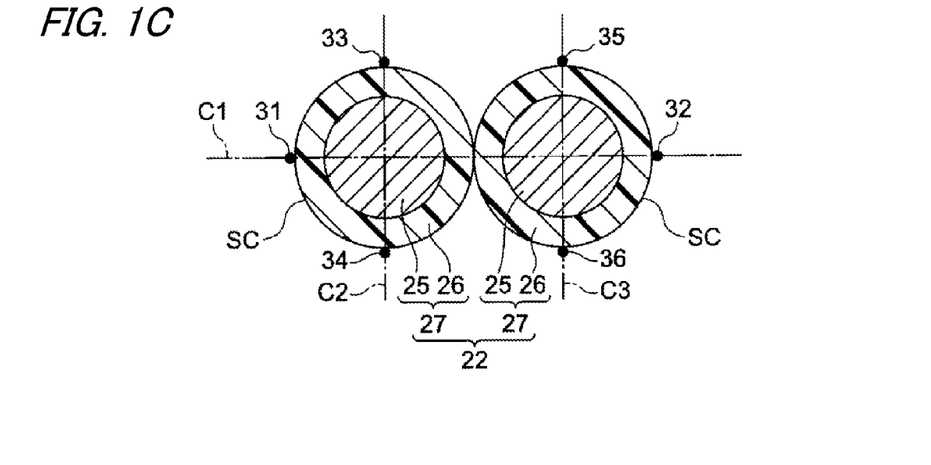
Figure 2A:
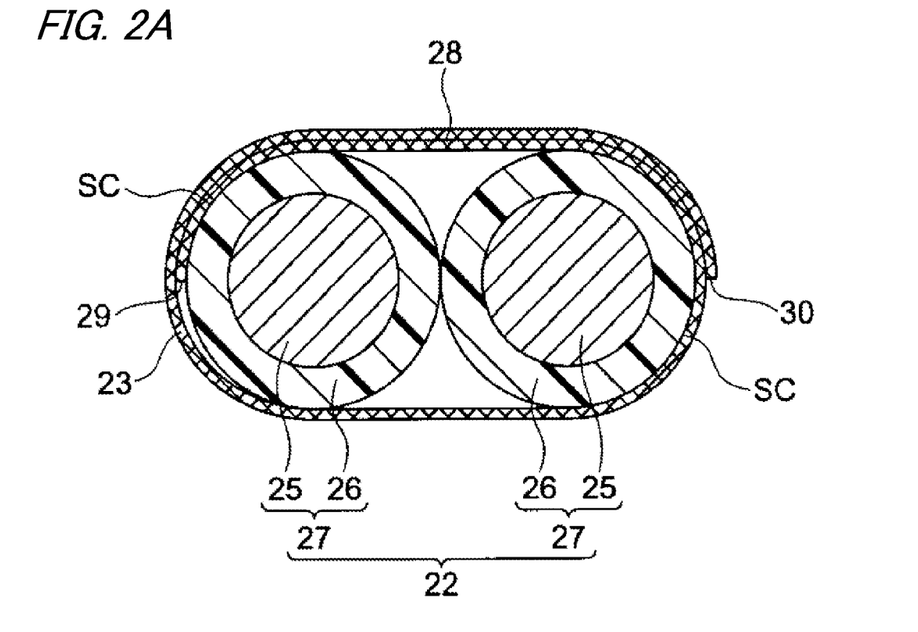
FIG. 2A is a sectional view of the shield wire of the present invention.
Figure 2B:
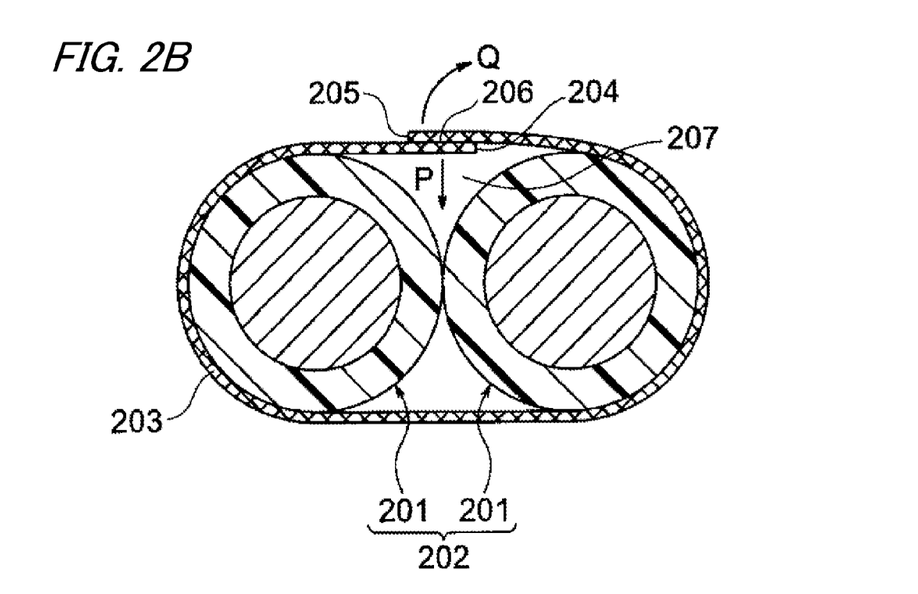
FIG. 2B is a sectional view of a shield wire as a comparative example.
Figure 3A:
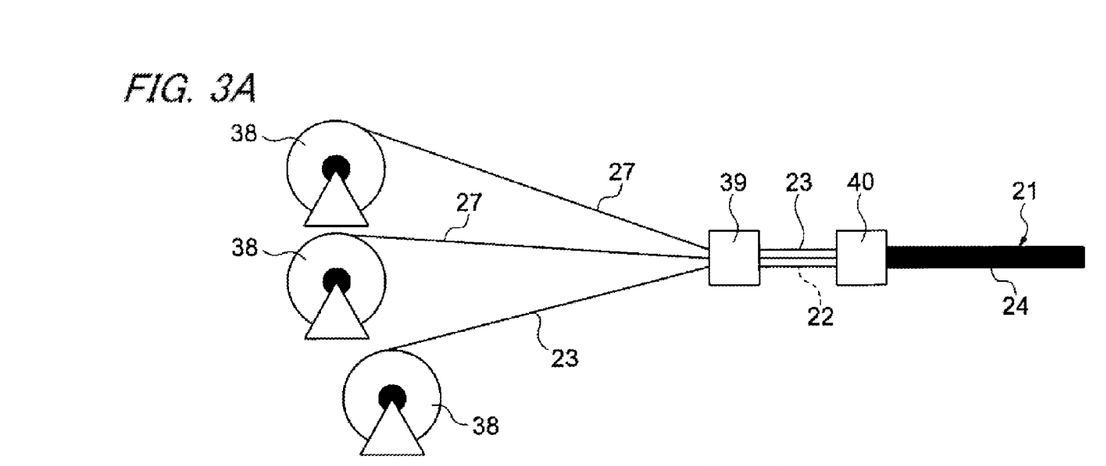
FIG. 3A is a schematic view of an entire part of manufacturing processes.
Figure 3B:
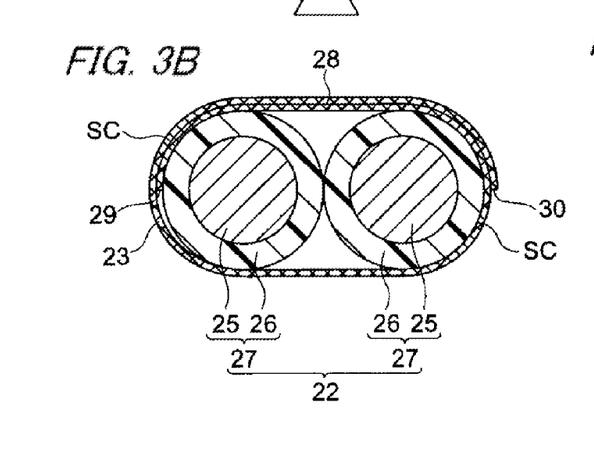
FIG. 3B is a sectional view showing a state that a conductor and a metal foil are fed.
Figure 3C:
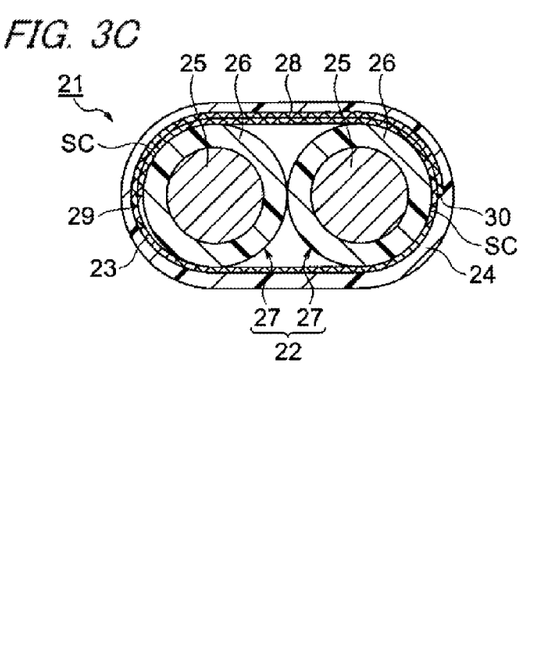
FIG. 3C is a sectional view showing a state that a sheath is extruded to coat.
Figure 6A:
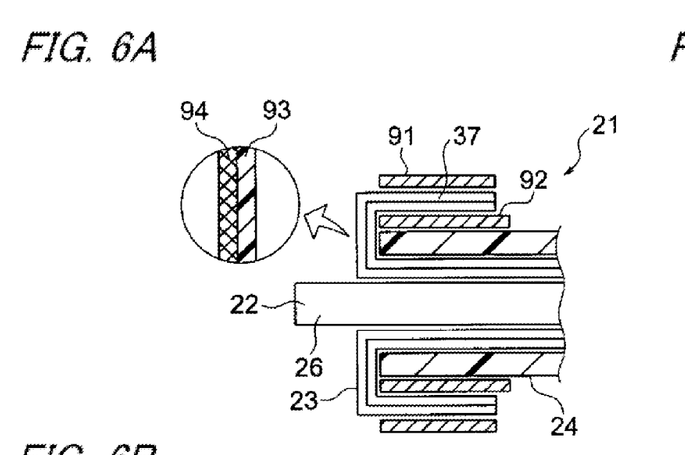
FIG. 6A to FIG. 6C are schematic sectional views relating to a terminal process of the shield wire.
Figure 6B:
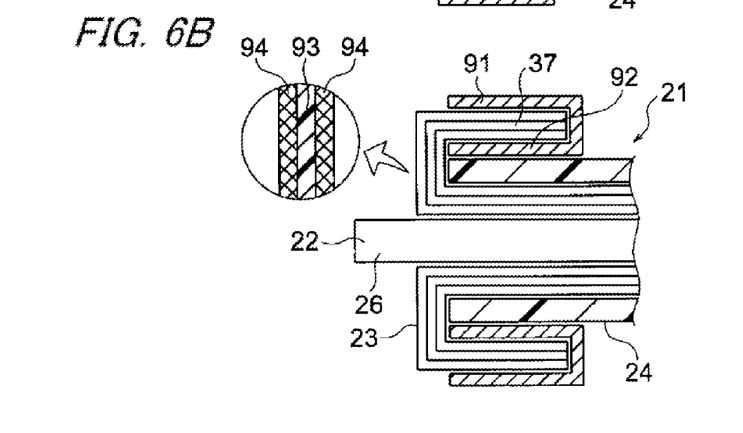
Figure 6C:
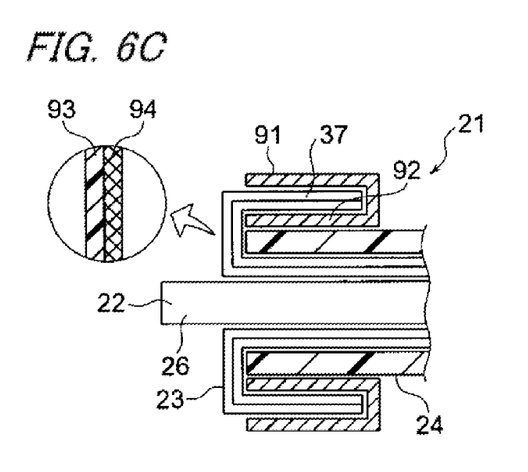
Figure 7:
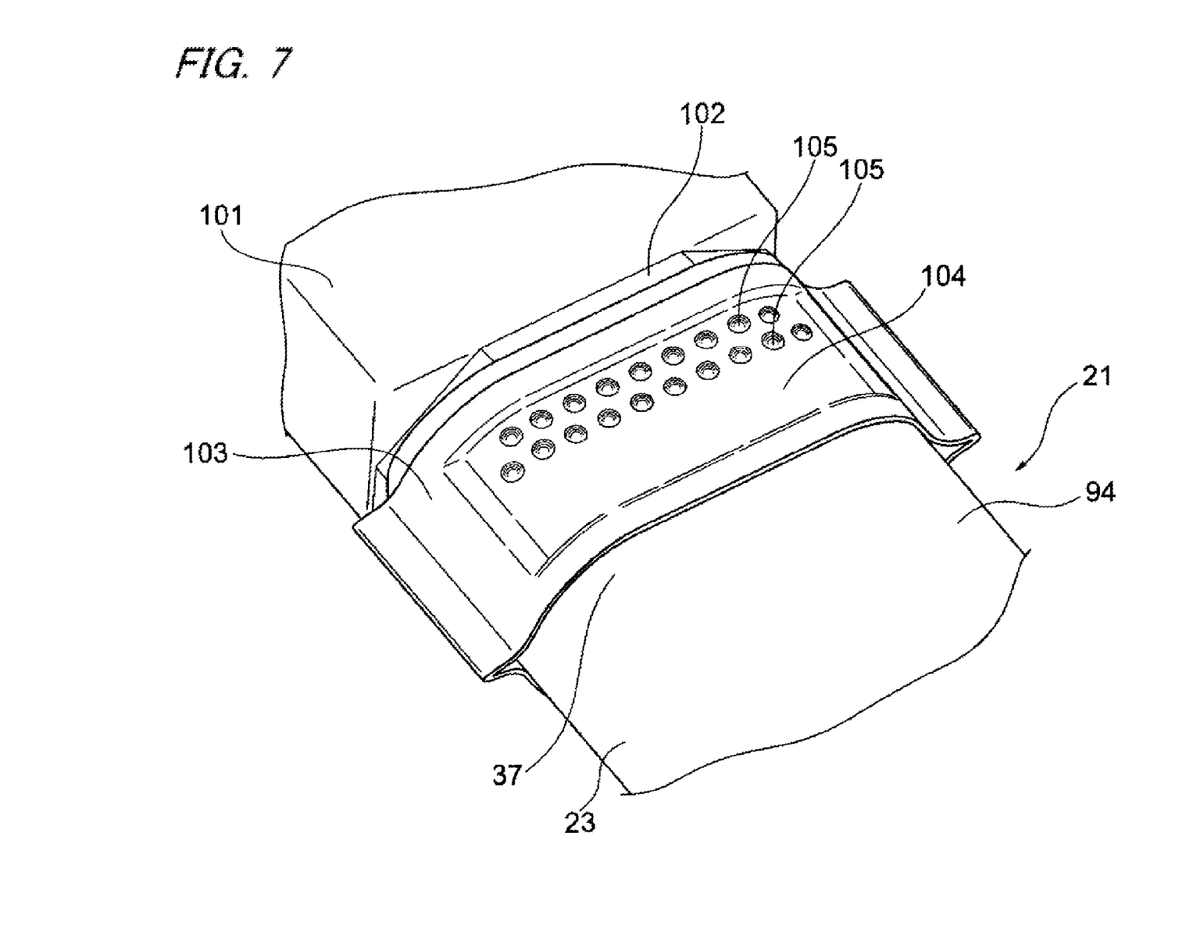
FIG. 7 is a perspective view relating to the terminal process of the shield wire.
Figure 8:
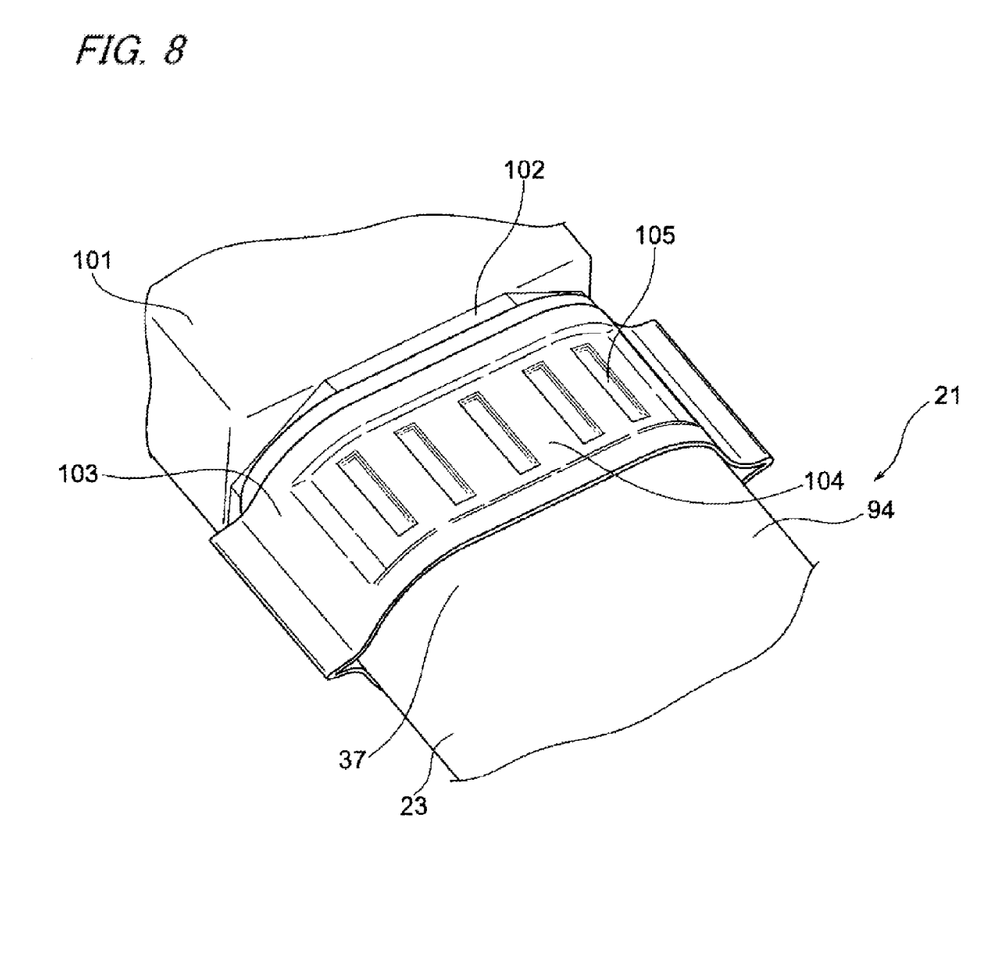
FIG. 8 is a perspective view relating to the terminal process of the shield wire.
Figure 9:
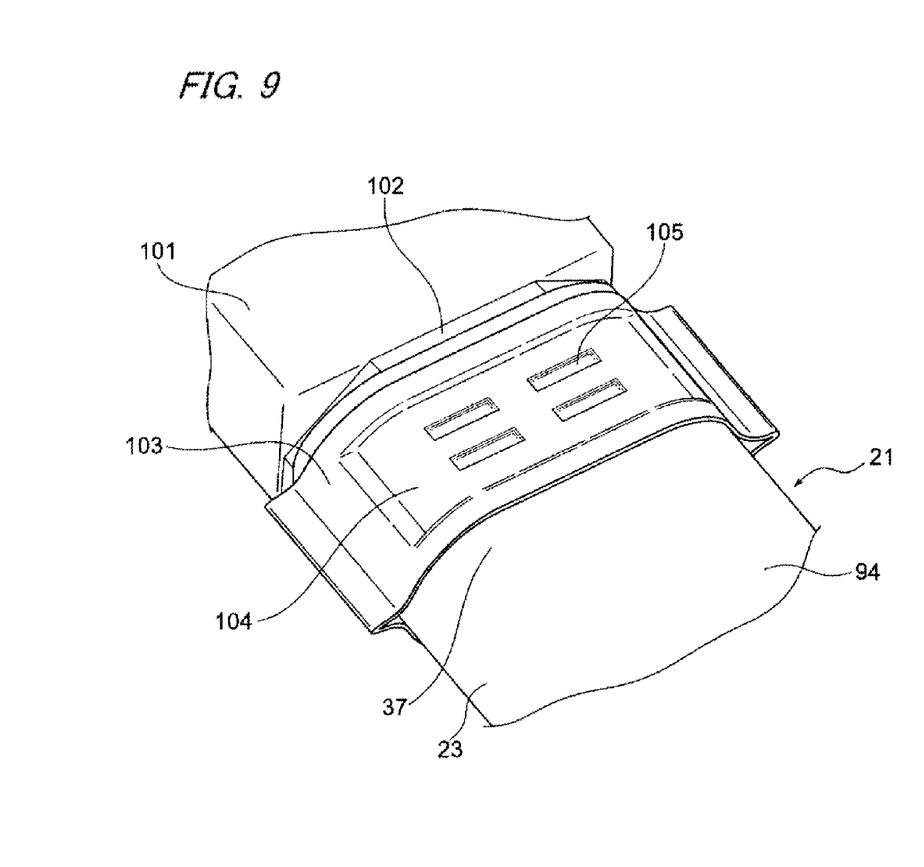
FIG. 9 is a perspective view relating to the terminal process of the shield wire.

Now, an exemplary embodiment will be described below by referring to the drawings. FIG. 1A to FIG. 1C are diagrams relating to a shield wire of the present invention. FIG. 1A is a schematic view of a vehicle, FIG. 1B is a sectional view of the shield wire and FIG. 1C is a diagram showing one end and the other end positions of an inner wire part. FIG. 2A and FIG. 2B are diagrams relating to a comparison of the shield wire. FIG. 3A to FIG. 3C are schematic views relating to a manufacturing method of the shield wire. FIG. 4A to FIG. 6C are sectional views relating to other examples of the shield wire. FIG. 7 to FIG. 9 are perspective views relating to a terminal process of the shield wire.

In the present exemplary embodiment, an example will be adopted and described that the shield wire of the present invention is used for a wire harness arranged in a hybrid motor vehicle (an electric motor vehicle may be used). Not only a high tension shield wire for the hybrid motor vehicle, but also a low tension shield wire which can be used for a gasoline automobile may be used as an object to which the present invention is applied.

In FIG. 1A, reference numeral 1 shows a hybrid motor vehicle. The hybrid motor vehicle 1 indicates a vehicle which mixes two powers of an engine 2 and a motor unit 3 to be driven. To the motor unit 3, an electric power from a battery 5 (a battery pack) is supplied through an inverter unit 4. In the present exemplary embodiment, the engine 2, the motor unit 3 and the inverter unit 4 are mounted on an engine room 6 at a position where front wheels are located. Further, the battery 5 is mounted in a rear part 7 of the motor vehicle where rear wheels are located. The battery 5 may be mounted in a motor vehicle compartment located in a rear part of the engine room 6.

The motor unit 3 is connected to the inverter unit 4 by a wire harness 8. Further, the battery 5 is also connected to the inverter unit 4 by a wire harness 9. The wire harnesses 8 and 9 are formed as wire harnesses for a high tension. The wire harness 8 is sometimes referred to also as a motor cable. The wire harness 8 is formed to be shorter than the wire harness 9.

The wire harness 9 has an intermediate part 10 arranged in an under-floor part 11 of the vehicle. The wire harness 9 may be arranged inside the motor vehicle compartment. The under-floor part 11 of the vehicle is located in a ground side of a vehicle body and forms a part as what is called a panel member. At a prescribed position thereof, a through hole not shown in the drawing is formed so as to pass through. The part of the through hole is provided with a waterproof structure (an illustration is omitted) to waterproof the wire harness 9.

The wire harness 9 is connected to the battery 5 through a junction block 12 provided in the battery 5. To the junction block 12, a rear end 13 of the wire harness 9 is connected. The rear end 13 side of the wire harness 9 is arranged above a floor inside the motor vehicle compartment. In a part above the floor, a front end 14 side of the wire harness 9 is also arranged. The front end 14 side of the wire harness 9 is connected to the inverter unit 4.

Here, when the present exemplary embodiment is additionally described, the motor unit 3 is supposed to include a motor and a generator in its structure. Further, the inverter unit 4 is supposed to include an inverter and a converter in its structure. The motor unit 3 is supposed to be formed as a motor assembly including a shield case. Further, the inverter unit 4 is also supposed to be formed as an inverter assembly including a shield case. The battery 5 is supposed to be a battery of an Ni-MH system or an Li-ion system and formed as a module. For instance, a storage battery such as a capacitor can be used. As long as the battery can be used for the hybrid motor vehicle 1 or the electric vehicle, the battery 5 is not especially limited.

In FIG. 1A and FIG. 1B, the wire harness 9 which connects the inverter unit 4 to the battery 5 is formed to include a shield wire 21 according to the present invention. As described below, the shield wire 21 can be made to be lighter than a shield wire of a conventional example. Further, the shield wire 21 is formed so as to sufficiently exhibit a shielding function. Further, the shield wire 21 is formed so as to suppress a deformed external form or simplify processes or devices.

The shield wire 21 is formed to include an inner wire part 22 and a metal foil shield member 23 provided outside the inner wire part 22. The shield wire 21 is formed to further include a sheath 24 provided outside the metal foil shield member 23.

The inner wire part 22 includes a plurality of conductors 25 and insulators 26 with which the plurality of conductors 25 are coated. In the present exemplary embodiment, the two conductors 25 and the insulators 26 which respectively coat the two conductors 25. The two conductors 25 are respectively circular in section. The insulators 26 cover outer peripheries of the conductors 25. The inner wire part 22 of the present exemplary embodiment is formed with two inner wires, namely, two insulating wire cores 27 arranged which respectively include the one conductor 25 and the insulator 26 coating the conductor 25 (other examples will be described below). The two insulating wire cores 27 are the same members and arranged so as to come into contact with each other and enveloped and held by the metal foil shield member 23 so as not to move.

The insulating wire core 27 is preferably manufactured so that a sectional area of the shield wire 21 is 3 mm$^2$ to 30 mm$^2$. The insulating wire core 27 is manufactured as what is called a thick wire. The insulating wire core 27 is formed so as to have the same flexibility as that of a usual insulating wire core, or such a rigidity as to hold a form along an arranged path of the wire harness 9 by itself, namely, a rigidity by which a bent form can be maintained without returning to an original form when a bending is applied from a linear state.

For the conductor 25, a twisted wire conductor of a circular form in section is used, which is formed by twisting element wires made of copper, copper alloy, aluminum or aluminum alloy. A material of the conductor 25 is not limited thereto and a material used as a conductor of a wire may be applied. Further, the conductor 25 is not limited to the twisted wire conductor and a conductor having a round single core may be used. When the conductor 25 is made to be inexpensive and light, aluminum or the aluminum alloy of the above-described materials may be effectively used.

The insulator 26 is provided as a member for covering, insulating and protecting the conductor 25. The insulator 26 is formed in a circular form in section by extruding a resin material. The insulator 26 is extruded and molded so that the conductor 25 may be coated therewith with a uniform thickness. As materials suitable for the insulator 26, are exemplified thermoplastic materials such as polyethylene, polypropylene, polyvinyl chloride, fluorine resin, etc. In the present exemplary embodiment, crosslink polyethylene is used. The materials of the insulator 26 are not limited thereto, and a material used as an insulator of a wire may be applied.

The metal foil shield member 23 is a member which allows the shield wire 21 to have the shielding function and includes a metal foil. As the metal foil, well-known metal foils such as a copper foil, an aluminum foil or an iron foil are used. The metal foil shield member 23 is formed with only the metal foil or the metal foil and a resin layer (specifically described below). The metal foil shield member 23 is formed in the shape of a sheet so that the inner wire part 22 may be enveloped in the direction of an outer periphery. In the metal foil shield member 23 configured in the sheet, as a width thereof (a length along a direction where the metal foil shield member turns the periphery of the inner wire part 22), such a length, is ensured, as to pile the metal foil shield member 23 in one block when the metal foil shield member envelops the inner wire part 22. Accordingly, in the metal foil shield member 23, an overlapped part 28 as one block in which the metal foil shield member 23 is piled can be formed.

As for a size of the metal foil shield member 23 configured in the sheet, the metal foil shield member 23 is formed in such a size that one end and the other end (reference numerals are omitted) in a longitudinal direction (a length in a direction which intersects at right angles to an arranged direction of the conductors 25) may be located at terminal ends of the insulating wire cores 27. Further, the metal foil shield member 23 configured in the sheet is formed in such a size that one end 29 and the other end 30 in a direction of width of the sheet as a transverse direction may be located in semicircular parts SC outside in the direction of width of the inner wire part 22 when the metal foil shield member envelops the inner wire part 22. The semicircular part SC indicates a part of an outer surface of the insulator 26 which is not opposed to the other adjacent insulator 26. As a specific example, the metal foil shield member 23 configured in the sheet is formed with such a size that the one end 29 and the other end 30 in the direction of width of the sheet as the transverse direction may be located at one end and the other end as outermost parts of the inner wire part 22 when the metal foil shield member envelops the inner wire part 22. The shield wire of the present invention is not limited to a structure in which the one end 29 and the other end 30 in the direction of width of the sheet are located at the one end and the other end as the outermost parts of the inner wire part 22. The one end 29 and the other end 30 in the direction of width of the sheet may be respectively located in the one semicircular part SC and the other semicircular part SC of the inner wire part 22.

Positions of the semicircular parts SC outside in the direction of width of the inner wire part 22 and positions of the one end and the other end as the above-described outermost parts of the inner wire part 22 are important positions when the inner wire part 22 is enveloped by the metal foil shield member 23.

In FIG. 1C, when it is assumed that a central axis of the inner wire part 22 as the arranged direction of the conductors 25 is set to C1 and central axes which intersect at right angles to the central axis C1 and pass through centers of the insulating wire cores 27 and extend in vertical directions are set to C2 and C3, on the central axis C1, positions of dots 31 and 32 in the drawing correspond to the positions of the one end and the other end as the outermost parts of the inner wire part 22. Further, on the central axis C2, positions of dots 33 and 34 in the drawing correspond to the positions of the one end and the other end as the outermost parts of the inner wire part 22. Further, on the central axis C3, positions of dots 35 and 36 in the drawing correspond to the positions of the one end and the other end as the outermost parts of the inner wire part 22. The semicircular part SC corresponds to a position of such a circular arc as to connect together the dots 33, 31 and 34 in the drawing and a position of such a circular arc as to connect together the dots 35, 32 and 36 in the drawing.

The dots 31 to 36 are points which are set for the convenience of an explanation and are not actually seen. The dots 31 to 36 indicate positions which come into contact with outer peripheral surfaces of the insulators 26. By viewing on the central axes C1 to C3, the dots 31 to 36 point vertex parts of the inner wire part 22.

The metal foil shield member 23 can envelop the inner wire part 22 under a state that the metal foil shield member is wound by at least one round on the inner wire part 22, namely, the metal foil shield member passes the dots 31 to 36. In the present exemplary embodiment, when the metal foil shield member 23 envelops the inner wire part 22 in such a way, the one end 29 and the other end 30 in the direction of width of the sheet correspond to the positions of the dots 31 and 32 or are located in the vicinity thereof (the positions of the one end 29 and the other end 30 are arranged at positions adapted to the semicircular parts SC).

In FIG. 1B and FIG. 1C, the shield wire 21 is formed in such a way that the metal foil shield member 23 begins to be wound from the position of the dot 31 to make the round of the outer periphery of the inner wire part 22, is wound on the dot 33, the dot 35, the dot 32, the dot 36, the dot 34 and the dot 31 in order, then, is overlapped from the position of the dot 31 to form the overlapped part 28, and is further wound on the dot 33 and the dot 35 in order and finishes a winding operation at the position of the dot 32.

In the one end and the other end (reference numerals are omitted) in the longitudinal direction of the metal foil shield member 23, ground connecting parts 37 (see FIG. 6) are respectively provided. The ground connecting parts 37 are provided as parts for grounding. The ground connecting parts 37 will be described below by referring to FIG. 6.

The sheath 24 is extruded outside the metal foil shield member 23 to coat the metal foil shield member and has an insulating property. As a material of the sheath 24, a rein material is supposed to be preferably suitable which is good in various kinds of properties such as an abrasion resistance, a heat resistance, a weather-ability, an impact resistance, an extrusion mold-ability. In this case, the shield wire 21 may be advantageously provided with no sheath member. As the sheath member, a corrugated tube or a protector may be used.

Figure 1D:
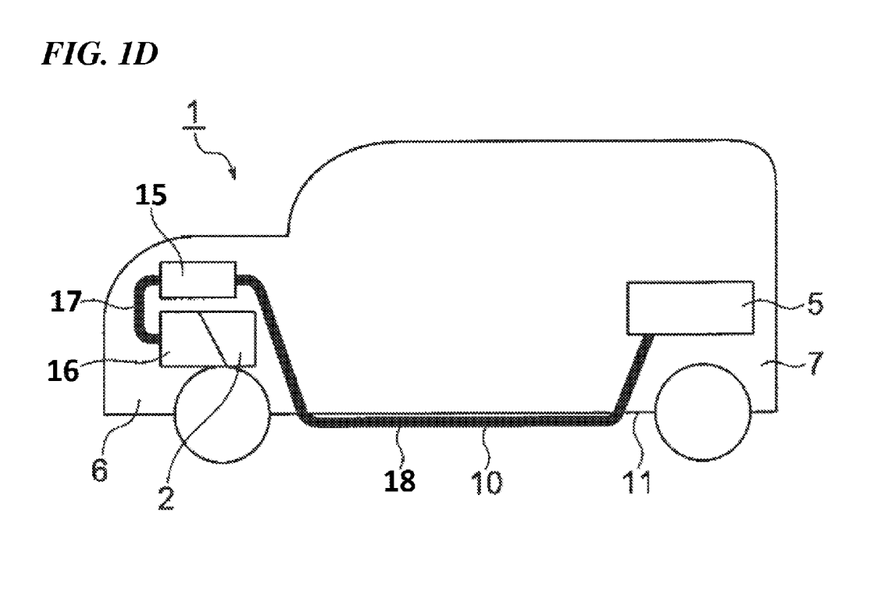
FIG. 1D is a schematic view of a vehicle.

In FIG. 1D, reference numeral 1 shows a hybrid motor vehicle similar to that illustrated in FIG. 1A. The hybrid motor vehicle 1 indicates a vehicle which mixes two powers of an engine 2 and a motor 16 to be driven. To the motor 16, an electric power from a high tension battery 5 is supplied through an inverter 15. In the present exemplary embodiment, the engine 2, the motor 16 and the inverter 15 are mounted on an engine room 6. The inverter 15 is connected to the motor 16 by a shield wire 17. The inverter 15 is connected to the high tension battery 5 through a shield wire 18.

In FIG. 2A, as can be understood from the positions of the one end 29 and the other end 30, the metal foil shield member 23 envelops the inner wire part 22 so that a part substantially half as long as the outer periphery of the inner wire part 22 may form the overlapped part 28. Further, as apparent from the positions of the one end 29 and the other end 30, in the metal foil shield member 23, the ends do not collapse, or do not bound.

Here, referring to FIG. 2B, the collapse of the ends or the bound of the ends will be described. FIG. 2B shows a sectional view of a shield wire as a comparative example (a sheath is omitted).

In FIG. 2B, an inner wire part 202 formed with two insulating wire cores 201 is enveloped and shielded by a shield member 203. One end 204 and the other end 205 of the shield member 203 are arranged so as to be located just above a position between the two insulating wire cores 201. An overlapped part 206 is formed short. The above-described shield member 203 has a fear that the one end 204 may possibly collapse in a space 207 between the insulating wire cores 201 as shown by an arrow mark P. Further, the shield member 203 has a fear that the other end 205 may possibly bound as shown by an arrow mark Q.

In FIG. 3A to FIG. 3C, the shield wire 21 is manufactured by, for instance, below-described processes. Namely, the insulating wire cores 27 are individually supplied from two drums 38 and the metal foil shield member 23 is supplied from another drum 38. After that, the metal foil shield member 23 is provided outside the inner wire part 22 by a metal foil molding die 39 (see FIG. 3B). Further, the sheath 24 is extruded to coat by a sheath molding die 40 (see FIG. 3C) to manufacture the shield wire.

The above-described shield wire 21 may be replaced by modified examples (modified examples of the shield wire) as shown in FIG. 4A to FIG. 5C. Now, the modified examples will be described below.

Figure 4A:
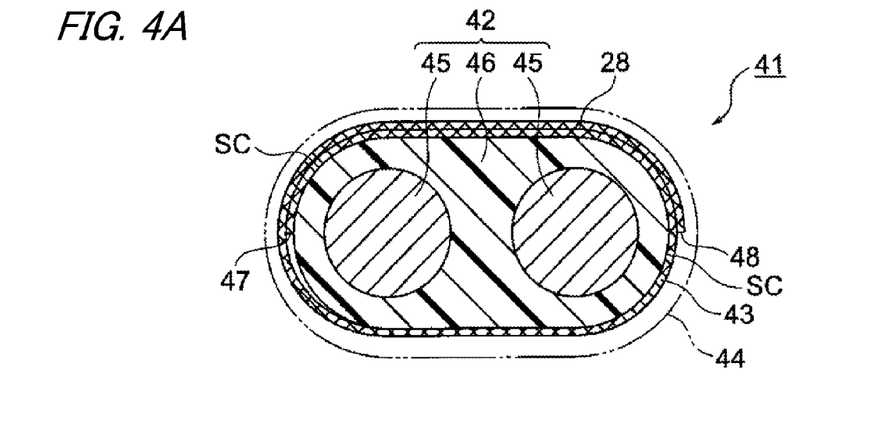
FIG. 4A to FIG. 4C are sectional views relating to other examples of the shield wire.

In FIG. 4A, a shield wire 41 is formed to include an inner wire part 42 and a metal foil shield member 43 provided outside the inner wire part 42, and further include a sheath 44 provided outside the metal foil shield member 43. The inner wire part 42 includes two conductors 45 and an insulator 46 which coats the two conductors 45 together. Positions of one end 47 and the other end 48 of the metal foil shield member 43 are arranged at the same positions as those of the metal foil shield member 23 of the above-described shield wire 21 described by referring to FIG. 1B, namely, the positions adapted to the semicircular parts SC.

Figure 4B:
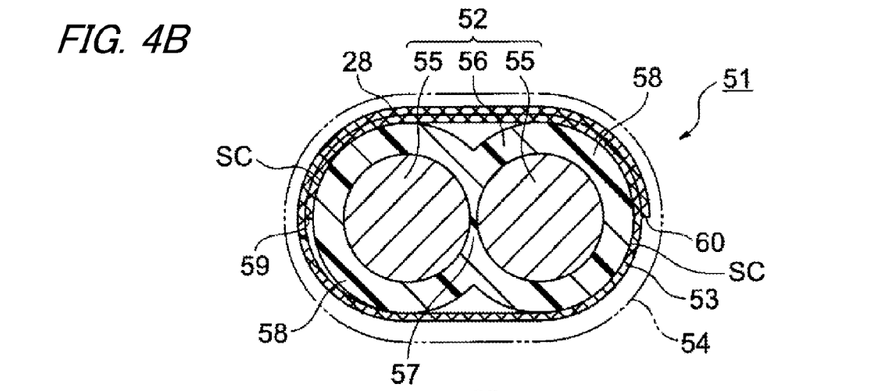

In FIG. 4B, a shield wire 51 is formed to include an inner wire part 52 and a metal foil shield member 53 provided outside the inner wire part 52, and further include a sheath 54 provided outside the metal foil shield member 53. The inner wire part 52 includes two conductors 55 and an insulator 56 which covers the two conductors 55 together. The insulator 56 includes a part sandwiched by the adjacent conductors 55, in other words, an "adjacent part 57" as a part in which the conductors 55 are adjacent to each other and a "non-adjacent part 58" as a part except the adjacent part 57. The adjacent part 57 is formed to have a width narrower than that of the non-adjacent part 58. In the inner wire part 52, since the adjacent part 57 is narrow, a space can be the more saved. Positions of one end 59 and the other end 60 of the metal foil shield member 53 are arranged at the same positions as those of the metal foil shield member 23 of the above-described shield wire 21 described by referring to FIG. 1B, namely, the positions adapted to the semicircular parts SC.

Figure 4C:
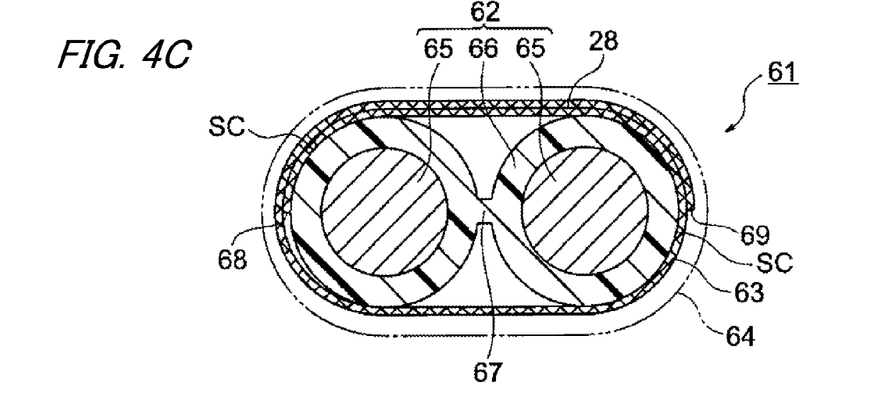

In FIG. 4C, a shield wire 61 is formed to include an inner wire part 62 and a metal foil shield member 63 provided outside the inner wire part 62, and further include a sheath 64 provided outside the metal foil shield member 63. The inner wire part 62 includes two conductors 65 and an insulator 66 which covers the two conductors 65 together. The insulator 66 includes a bridge part 67 in a part sandwiched by the adjacent conductors 65. Positions of one end 68 and the other end 69 of the metal foil shield member 63 are arranged at the same positions as those of the metal foil shield member 23 of the above-described shield wire 21 described by referring to FIG. 1B, namely, the positions adapted to the semicircular parts SC.

Figure 5A:
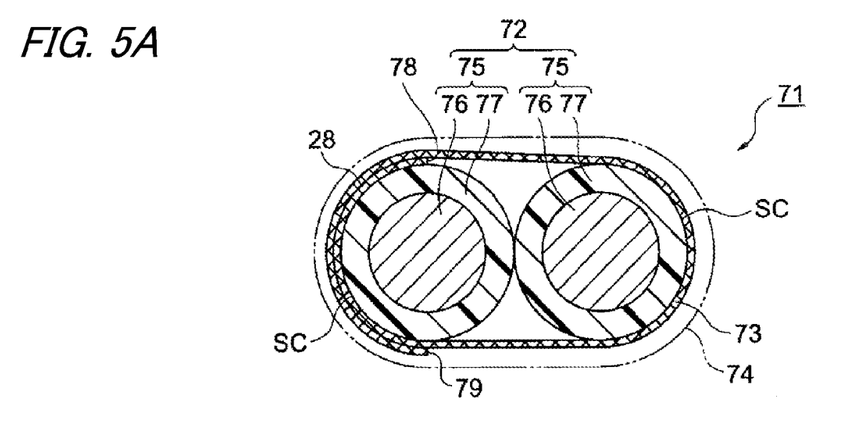
FIG. 5A to FIG. 5C are sectional views relating to other examples of the shield wire.

In FIG. 5A, a shield wire 71 is formed to include an inner wire part 72 and a metal foil shield member 73 provided outside the inner wire part 72, and further include a sheath 74 provided outside the metal foil shield member 73. The inner wire part 72 includes two insulating wire cores 75. The insulating wire cores 75 include conductors 76 and insulators 77 which cover the conductors 76. Positions of one end 78 and the other end 79 of the metal foil shield member 73 are arranged at different positions from those of the metal foil shield member 23 of the above-described shield wire 21 described by referring to FIG. 1B. Namely, the one end 78 and the other end 79 are arranged at the positions of the dots 33 and 34 shown in FIG. 1C (arranged at the positions of the semicircular part SC).

Figure 5B:
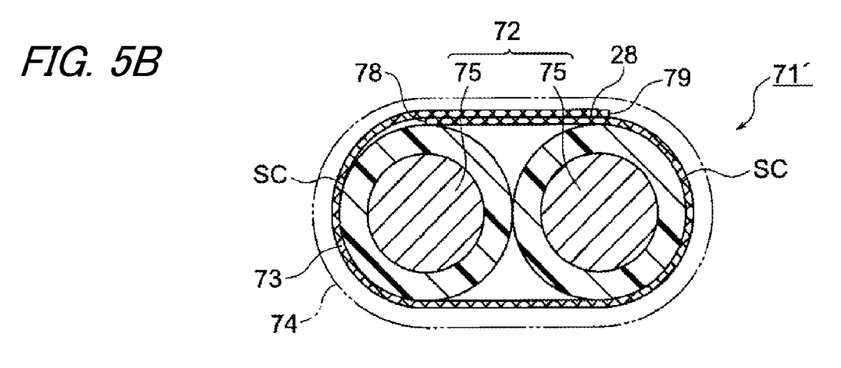

In FIG. 5B, a shield wire 71' is different from the shield wire 71 shown in FIG. 5A in view of a below-described point. Namely, positions of one end 78 and the other end 79 of a metal foil shield member 73 are different. The one end 78 and the other end 79 are arranged at the positions of the dots 35 and 33 shown in FIG. 1C (arranged at the positions of the semicircular parts SC).

Figure 5C:
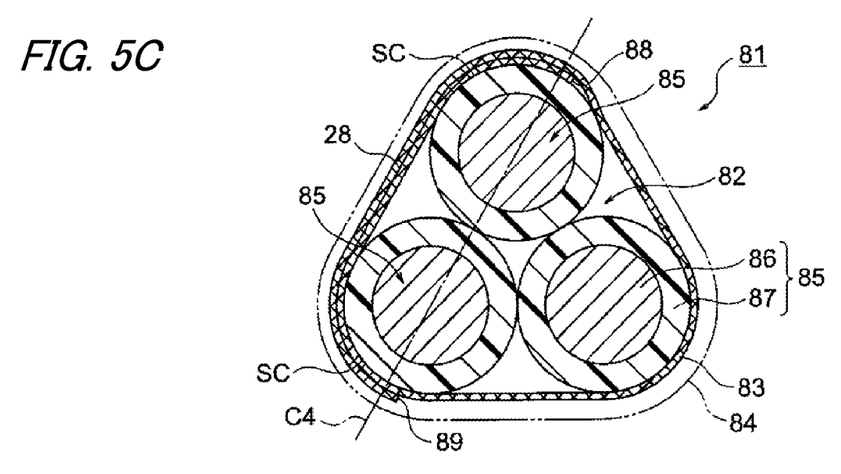

In FIG. 5C, a shield wire 81 is formed to include an inner wire part 82 and a metal foil shield member 83 provided outside the inner wire part 82, and further include a sheath 84 provided outside the metal foil shield member 83. The inner wire part 82 is formed with three insulating wire cores 85. The insulating wire cores 85 include conductors 86 and insulators 87 which cover the conductors 86. The three insulating wire cores 85 are held by the metal foil shield member 83 and bundled substantially in a triangular form in section. The metal foil shield member 83 is arranged so that positions of one end 88 and the other end 89 thereof correspond to positions of one end and the other end as outermost parts of the inner wire part 82 on, for instance, a central axis C4 (arranged so as to be adapted to the positions of the semicircular parts SC). Since the shield wire 81 has the three insulating wire cores 85, the shield wire is supposed to be preferably suitably used for the wire harness 8 shown in FIG. 1A.

FIG. 6A to FIG. 6C are schematic sectional views relating to a terminal process of the shield wire. For the structure of the metal foil shield member 23 or the ground connecting parts 37 respectively provided in the one end and the other end in the longitudinal direction of the metal foil shield member 23, by referring to the sectional views, three examples will be exemplified and described below (For convenience sake, gaps are provided and shown between component members).

In FIG. 6A, as the terminal process of the shield wire 21 of the first example, the terminal is processed in such a way that the sheath 24 is removed by a prescribed length, then, the exposed metal foil shield member 23 is folded back outside the sheath 24, and the ground connecting part 37 as the folded back part is held by a caulking ring 91 and an underlay ring 92 made of metal and caulked from outside the caulking ring 91 under a state that the ground connecting part is held by them. The metal foil shield member 23 includes a resin layer 93 and a metal foil 94 provided in one surface of the resin layer 93 and is formed in the shape of a sheet. The metal foil 94 is arranged in the inner wire part 22 side. The metal foil 94 comes into electric contact with the caulking ring 91. As the resin layer 93, a PET resin is used in the present exemplary embodiment (this is one example). In the inner wire part 22 in an exposed state, the insulators 26 are removed by a prescribed length, and then, a terminal fitting is provided to carry out the terminal process (Other examples are similarly processed). The caulking ring 91 and the underlay ring 92 may be formed in a continuous shape as described below in FIGS. 6B and 6C.

In FIG. 6B, as the terminal process of the shield wire 21 of the second example, the terminal is processed in such a way that the sheath 24 is removed by a prescribed length, then, the exposed metal foil shield member 23 is folded back outside the sheath 24, and the ground connecting part 37 as the folded back part is held by a caulking ring 91 and an underlay ring 92 made of metal and caulked from outside the caulking ring 91 under a state that the ground connecting part is held by them. The metal foil shield member 23 includes a resin layer 93 and metal foils 94 provided in both surfaces of the resin layer 93 and is formed in the shape of a sheet. The metal foils 94 come into electric contact with the caulking ring 91 and the underlay ring 92. As the resin layer 93, a PET resin is used in the present exemplary embodiment. The caulking ring 91 and the underlay ring 92 are formed in a continuous shape. (They may be formed as separate bodies as shown in FIG. 6A).

In FIG. 6C, as the terminal process of the shield wire 21 of the third example, the terminal is processed in such a way that the sheath 24 is removed by a prescribed length, then, the exposed metal foil shield member 23 is folded back outside the sheath 24, and the ground connecting part 37 as the folded back part is held by a caulking ring 91 and an underlay ring 92 made of metal and caulked from outside the caulking ring 91 under a state that the ground connecting part is held by them. The metal foil shield member 23 includes a resin layer 93 and a metal foil 94 provided in the other surface of the resin layer 93 and is formed in the shape of a sheet. The metal foil 94 comes into electric contact with the underlay ring 92. As the resin layer 93, a PET resin is used in the present exemplary embodiment. The caulking ring 91 and the underlay ring 92 are formed in a continuous shape. (They may be formed as separate bodies as shown in FIG. 6A). As described above, the metal foil shield member 23 has a two-layer structure or a three-layer structure including the resin layer 93 and the metal foil 94, however, the structure of the metal foil shield member 23 in the shield wire of the present invention is not limited to the above-described structure. The metal foil shield member 23 may have an electric conductivity and such flexibility so that the metal foil shield member may make the round of the outer periphery of the inner wire part 22.

In the terminal processes of the shield wire 21 of the first to third examples, the structure of the metal foil shield member 23 includes the resin layer 93. However, the present invention is not limited thereto. Namely, the metal foil 94 may be independently used like three examples described below (In the example that the metal foil 94 is independently used, it is to be understood that the resin layer 93 may be included).

In FIG. 7 to FIG. 9, in the metal foil shield member 23 independently formed with the metal foil 94, an underlay ring 102 of a shield case 101 is inserted inside the ground connecting part 37 and a caulking ring 103 is externally fitted outside the ground connecting part. In the metal foil shield member 23, when a caulking process is applied to the caulking ring 103, the metal foil 94 is sandwiched between the caulking ring 103 and the underlay ring 102. Thus, a contact state is formed to complete an electric connection. In the caulking ring 103 to which the caulking process is applied, a first stage deformed part 104 and a second stage deformed part 105 are formed which are recessed inside in two stages and opening edges of which are not respectively edged. The first stage deformed part 104 and the second stage deformed part 105 are effective parts for an electric connection or a mechanic connection of the metal foil 94. The first stage deformed part 104 as a first stage recessed part is formed in a part which is weakly caulked to come into contact with the metal foil. Further, the second stage deformed part 105 provided in the first stage deformed part 104 is formed in a part which is relatively strongly caulked to come into contact with the metal foil.

In the case of FIG. 7, the second stage deformed part 105 is formed in the shape of a dimple. Further, in the case of FIG. 8 and FIG. 9, the second stage deformed part is formed in the shape of a bead.

As described above by referring to FIG. 1 to FIG. 9, according to the shield wire 21 of the present invention, since the shield member having the metal foil 94, that is, the metal foil shield member 23 is used, the shield member can be effectively made to be exceptionally lighter than the shield member formed with the braided wire. Further, in the shield wire 21 of the present invention, since the shield wire has a structure which includes the metal foil 94, however, does not use the drain line as in the conventional example, the shield wire can be effectively lightened the more for the drain line or effectively suppress the deformed external form. Further, according to the shield wire 21 of the present invention, since the end parts of the metal foil shield member 23 are arranged so as to suppress the collapse of the ends or the bound of the ends, the inner wire part 22 can be effectively held and stabilized and the shielding function can be sufficiently exhibited.

In addition thereto, according to the shield wire 21 of the present invention, since the metal foil shield member 23 has the ground connecting part 37, the inner wire part 22 can be effectively covered with the metal foil shield member 23 up to the terminal of the electric wire. Thus, a sufficient shield effect can be successfully obtained in the terminal of the electric wire.

It is to be understood that the present invention may be variously modified and embodied within a range which does not change a gist of the present invention.

While the present invention has been described in detail, or with reference to the specific embodiments, it is apparent for those skilled in the art that the invention may be modified and changed in various manners without departing from the scope and spirit of the invention.

In the shield wire 21 of the present invention, since the shield wire has a structure which includes the metal foil, however, does not use the drain line, the shield wire can be effectively lightened the more for the drain line or effectively suppress the deformed external form. Further, according to the present invention, since the end parts of the metal foil shield member are arranged so as to suppress the collapse of the ends or the bound of the ends, the inner wire part can be effectively held and stabilized and the shielding function can be sufficiently exhibited. The present invention is available for the shield wire having the shielding function.

What is claimed is:

1. A shield wire including:
    an inner wire part having a plurality of conductors and a plurality of insulators which cover the plurality of conductors; and
    a metal foil shield member having a metal foil and provided outside the inner wire part,
    wherein the metal foil shield member is formed in the shape of a sheet and wound by one round or more directly on an outer periphery of the inner wire part so as to envelop the inner wire part therein, one end of the metal foil shield member in a direction of width of the sheet is arranged in a semicircular part as a part of an outer surface of the insulator which is not opposed to the other adjacent insulator and the other end of the metal foil shield member in the direction of width of the sheet is arranged in the semicircular part,
    wherein both ends of the metal foil shield member in wire terminal sides are set as ground connecting parts, and
    wherein the respective ground connecting parts comprise respective underlay rings disposed inside respective folded back portions of the metal foil.

2. The shield wire according to claim 1, wherein a high tension battery is connected to an inverter or the inverter is connected to a motor by the shield wire.

3. The shield wire according to claim 1, wherein
    the metal foil shield member further comprises a sheath provided outside of the metal foil, and
    both ends of the metal foil are folded back over the sheath and attached to respective ground connecting parts.

4. The shield wire according to claim 1, wherein the respective ground connecting parts further comprise respective caulking rings disposed outside respective folded back portions of the metal foil in contact with the metal foil.

5. The shield wire according to claim 4, wherein the respective underlay rings are formed continuous with the respective caulking rings.

6. The shield wire according to claim 4, wherein the respective caulking rings comprise respective first deformed portions and respective second deformed portions.

7. The shield wire according to claim 6, wherein the respective second deformed portions comprise a plurality of dimples depressed downward in contact with the metal foil.

8. The shield wire according to claim 6, wherein the respective second deformed portions comprise a plurality of rectangular portions depressed downward in contact with the metal foil.

9. A shield wire including:
    an inner wire part comprising a plurality of conductors and a plurality of insulators covering the plurality of conductors;
    a metal foil shield member comprising a metal foil and provided outside the inner wire part;
    a first ground connecting part connected to a first terminal end of the metal foil; and
    a second ground connecting part connected to a second terminal end of the metal foil,
    wherein the metal foil shield member is formed in the shape of a sheet and wound around an outer periphery of the inner wire part so as to wholly surround the inner wire part therein,
    wherein the first ground connecting part comprises a first underlay ring disposed inside a folded first terminal end of the metal foil, and
    wherein the second ground connecting part comprises a second underlay ring disposed inside a folded second terminal end of the metal foil.

10. The shield wire according to claim 9, wherein the shield wire connects an inverter to a high tension battery or a motor.

11. The shield wire according to claim 9, wherein
    the metal foil shield member further comprises a sheath provided outside of the metal foil,
    the first terminal end of the metal foil is folded back over the sheath and in contact with the first ground connecting part, and
    the second terminal end of the metal foil is folded back over the sheath and in contact with the second ground connecting part.

12. The shield wire according to claim 9, wherein
    the first ground connecting part further comprises a first caulking ring disposed outside the folded first terminal end of the metal foil and in contact with the folded first terminal end of the metal foil, and
    the second ground connecting part further comprises a second caulking ring disposed outside the folded second terminal end of the metal foil and in contact with the folded second terminal end of the metal foil.

13. The shield wire according to claim 12, wherein
    the first underlay ring is formed continuous with the first caulking ring, and
    the second underlay ring is formed continuous with the second caulking ring.

14. The shield wire according to claim 12, wherein the first caulking ring comprises a first deformed portion.

15. The shield wire according to claim 14, wherein the first deformed portion comprises a plurality of dimples depressed downward in contact with the folded first terminal end of the metal foil.

16. The shield wire according to claim 14, wherein the first deformed portion comprises a plurality of rectangular portions depressed downward in contact with the folded first terminal end of the metal foil.

17. The shield wire according to claim 1, wherein the metal foil shield member is wound around the outer periphery of the inner wire so that the shield wire does not include a drain wire.

18. The shield wire according to claim 9, wherein neither the first ground connecting part nor the second ground connecting part comprise a drain wire.

\* \* \* \* \*